Aug. 5, 1941.　　　　J. J. HAZARD　　　　2,251,793
ENDLESS TYPE MOTION PICTURE PROJECTOR
Filed June 29, 1939　　　2 Sheets-Sheet 1
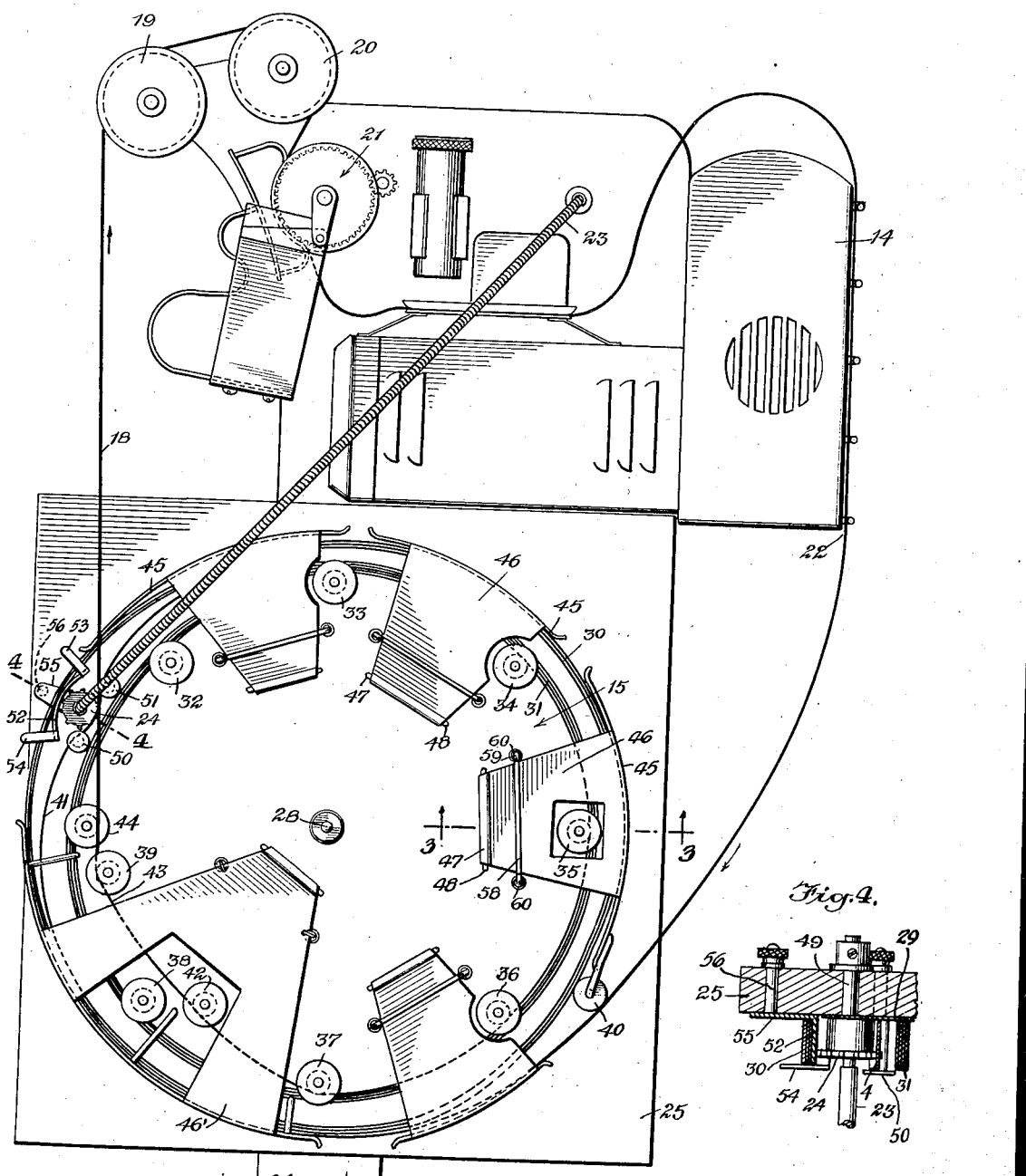
WITNESSES
INVENTOR
Joseph J. Hazard
BY
Munn, Anderson & Liddy
ATTORNEYS

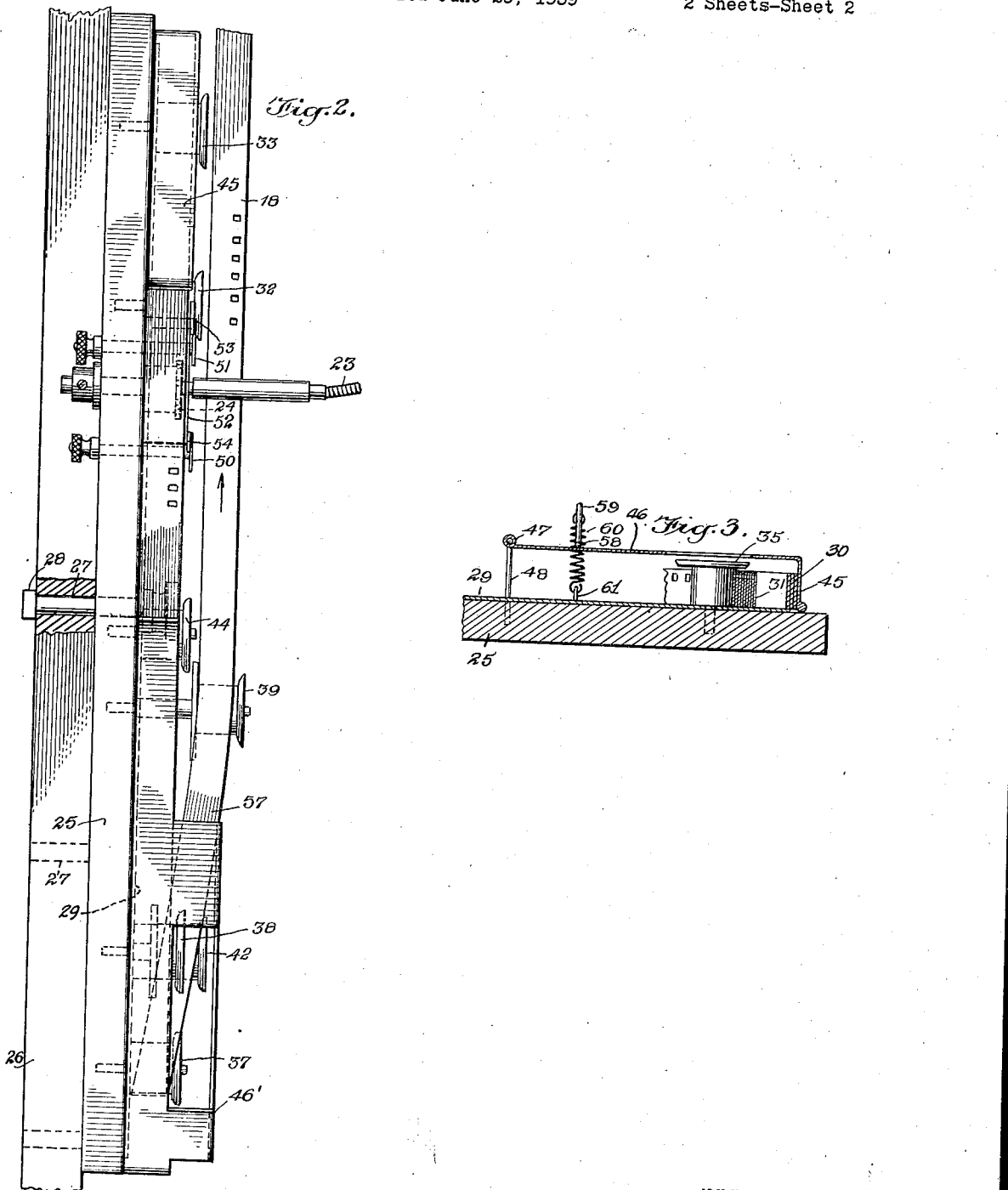

Patented Aug. 5, 1941

2,251,793

UNITED STATES PATENT OFFICE 2,251,793

ENDLESS TYPE MOTION PICTURE PROJECTOR

Joseph J. Hazard, Saratoga Springs, N. Y.

Application June 29, 1939, Serial No. 281,796

3 Claims. (Cl. 88—18.7)

This invention relates to an improved endless type motion picture projector, an object being to utilize improved means for actuating the projector and the film reel from the same driving power member.

Another object of the invention is to provide an improved reel and projector and associated parts connected to certain parts of an automatic talking machine whereby pictures may be projected simultaneously with the functioning of the phonograph.

An additional and more specific object of the invention is to provide a special reel structure for the projector whereby an endless film may be used and may be caused to travel at a desired speed.

A further object of the invention is to provide in a device of the character mentioned a reel for an endless film with parts adapted to be driven by power from the projector using the film, the structure being such that as the wound part of the film is unwound from the reel another part is wound thereon.

In the accompanying drawings—

Fig. 1 is a side view of a projector and reel embodying the invention.

Fig. 2 is an edge view of the reel and associated parts shown in Fig. 1, a portion being shown in section.

Fig. 3 is a sectional view taken approximately on the line 3—3 of Fig. 1, the same being on a somewhat enlarged scale.

Fig. 4 is an enlarged fragmentary sectional view through Fig. 1, taken approximately on the line 4—4.

In order for the projector 14 to function properly a suitable film must be provided. Said film is preferably a standard film but is connected together so as to be endless in order that all sections of the film may be used over and over without stopping the machine to rewind. As shown in Figs. 1 and 2, means have been provided for utilizing an endless film 18 which has the principal part wound on a specially constructed reel 15 and the remaining parts extending to and from the projector and also through the projector in the usual way. As shown in Fig. 1, the projector 14 may be any desired kind as the particular structure thereof forms no part of the present invention.

The film 18, as shown in Fig. 1, moves from the reel 15 over a guiding roller or spool 19 and then over a guiding roller or spool 20 to part of the mechanism 21 of the projector 14. From the mechanism 21 the film is fed in the usual manner to the projector and then at point 22 moves downwardly to the reel 15 where it is again wound thereon. This action is continuous during the functioning of the projector.

The driving mechanism of the projector operates at a certain speed and a flexible shaft 23 is connected with the driving mechanism so as to rotate at a proportional speed. This flexible shaft is connected with a small toothed wheel 24 so as to rotate the same and pull the film along on the reel at a speed in proportion to the movement of the film through the projecting machine. The toothed wheel 24 and associated parts form part of the reel 15 and will be more fully and exactly described hereinafter.

As shown particularly in Fig. 2, there is provided base means consisting of a reel block 25 which may be wood or other suitable material, and which is supported by a standard 26 also of wood or other suitable material. The standard 26 is provided with several openings 27 through one of which a clamping bolt 28 extends, said bolt occupying the center of the block 25 and also the center of a covering metal plate 29 (Fig. 3) forming part of the base means. By shifting the bolt 28 upwardly or downwardly films of different lengths may be used. It will be understood that the block 25 when in use is stationary and the projecting or covering plate 29 also is stationary. Arranged on the face of the plate 29 are a number of rollers hereinafter fully described which receive the film and are rotated as the film moves along.

When winding the film on the reel 15 the film is divided into what may be termed an outer section or layer 30 and an inner section or layer 31. The inner section or layer 31 is carried by the respective rollers 32, 33, 34, 35, 36, 37, 38 and 39. The film leading from point 22 down to the reel passes over a guiding roller 40 and merges into the outer section 30 of the film, while the outer section at the zone 41 moves underneath the toothed wheel 24 and thence into the inner section 31. The film from the inner section 31 extends from roller 39 to a point exterior of a roller 42 but interior of roller 38. The zone 43 of the film passes over roller 39 and under roller 44 and thence directly upwardly to the roller or spool 19. All of the rollers mentioned are supported by suitable pins carried by the block 25 so that the rollers may freely rotate but remain in their respective fixed position. These rollers are preferably provided with a flange at one end though in some instances flanges at both ends may be used.

The section 31 of the film has a tendency to move inwardly but this section is supported by certain rollers hereinbefore mentioned, while section 30 has a tendency to move outwardly or expand. To prevent unnecessary or undue expansion, there are provided a number of guiding walls 45, said walls, as shown in Fig. 3, forming part of and carried by plate members 46. These plates are hingedly mounted at 47 on suitable U-shaped members 48, whereby these plates may be swung inwardly toward the bolt 28 whenever desired. Each plate is provided with a wall 45 and these walls, in some instances, extend an appreciable distance beyond the plate so that there is an outer confining wall practically encircling the section 30 to prevent undue expansion thereof. If the entire supply of film were wound on the inner section 31, there would be an unnecessary and undesirable tension during the functioning of the device. For this reason the coiled or wound film has been arranged in two groups or sections 30 and 31 and the film fed to the projector is from the inner group or section 31. In order to properly feed the film from the outer section to the inner section, the toothed wheel 24 is utilized.

As shown in Figs. 1 and 4, it will be observed that the toothed wheel is rotated by the flexible shaft 23 and provided with a suitable bearing 49 (Fig. 4) so that it may freely rotate but remain in a fixed position. Associated with the toothed wheel 24 are small guiding spools 50 and 51 over which the film 18 passes and as shown in Fig. 1, the film moves under the toothed wheel. In this way the toothed wheel 24 is permitted to pull and also to push the film as it moves from the outer section 30 to the inner section 31. This will prevent any undesirable tension on the film at any point. To prevent the outer section 30 from engaging the toothed wheel 24, there is provided an arc-shaped member or protecting guard 52 having guiding fingers 53 and 54 at the respective ends and a supporting arm 55 secured to the block 25 by a suitable bolt 56. As fast as the toothed wheel 24 moves the film at one point, further sections of the film are fed over the guiding roller 40 to become part of the outer section 30. As the outer section moves it slides on the walls 45 of the respective plates or members 46, which members are shown in detail in Fig. 3. Member 46' is shown at the lower part of Fig. 1 as being much larger than the other members and also much deeper, as illustrated in Fig. 2, so that the diagonal section 57 of the film may be permitted to readily pass from roller 37 to roller 39. As heretofore mentioned all of the members 46 are pivotally mounted through the use of members 47 and 48, whereby they may be arranged as shown in Figs. 1 and 3, or the guiding walls 45 may be swung inwardly to a vertical position or over until all the members 46 contact and form a rough cone at the center. By swinging these members inwardly either individually or together, the various guiding spools or rollers will be exposed and the film may be readily placed in position on the reel or removed therefrom. Each bar 58 is connected by means of solder or otherwise to the respective members 46 and each bar at each end is provided with an upstanding arm 59 to the upper end of which one end of a spring 60 is connected. The other end of each spring is anchored at 61 to the block 25. The various springs 60, therefore, will hold the parts normally in the position shown in Figs. 1 and 3, but they may be manually swung from this position a short distance or through more than a 90° arc as desired.

During the functioning of the projector, the usual projector mechanism will pull the film over the guiding spools or rollers 19 and 20 and, consequently, will pull the film from the inner section 31. As this is taking place, the entire section 31 is rotating or moving on the respective rollers 32 to 39, inclusive, and the toothed wheel 24 is pulling and then pushing the film from the outer section 30 to the inner section 31. This action is continuous as long as the projector is functioning. As the film is endless, all the exposures thereon will be brought to view and then the exposures will be repeated as the projector continues to function.

I claim:

1. In a motion picture projector, an endless film embodied in said projector, a reel structure including two separate series of film supports upon which the major portion of said film is carried in spaced individual coil form, a strand of the film connecting the coils across the space therebetween, one of the film supports comprising a circumferential series of arc plates encompassing substantially the entire periphery of the outer film coil, members carrying the arc plates and directed inwardly of the reel structure, hinge means swingably supporting the inner ends of said members providing for individually swinging the arc plates away from the film, and driver means situated contiguously to said space, having driving engagement with said strand to pull it from within the outer coil and push it toward the inner coil.

2. In a motion picture projector, an endless film embodied in said projector, a reel structure including two separate series of film supports upon which the major portion of said film is carried in spaced individual coil form, a strand of the film connecting the coils across the space therebetween, one of the film supports comprising a circumferential series of arc plates encompassing substantially the entire periphery of the outer film coil, members carrying the arc plates and directed inwardly of the reel structure, hinge means swingably supporting the inner ends of said members, providing for individually swinging the arc plates away from the film, driver means situated contiguously to said space, having driving engagement with said strand to pull it from the inner coil and push it toward the outer coil and against the arc plates, and a roller carried by one of the arc plates, being located between the respective arc plate and the arc plate next adjacent, guiding a re-entrant part of the film to it emplacement upon the outer coil.

3. In a motion picture projector, an endless film embodied in said projector, a reel structure including two separate series of film supports upon which the major portion of said film is carried in spaced individual coil form, a strand of the film connecting the coils across the space therebetween, one of the film supports comprising a circumferential series of arc plates encompassing substantially the entire periphery of the outer film coil, members carrying the arc plates and directed inwardly of the reel structure, base means for the reel structure, hinge means connecting the inner ends of said members to said base means, and at least one spring for each arc plate being attached at its ends to the respective member and to the base means, serving to hold an edge of the arc plate down against the base means subject to swinging upon said hinge means away from said base means.

JOSEPH J. HAZARD.